United States Patent [19]
Deutsch et al.

[11] 4,140,880
[45] Feb. 20, 1979

[54] HOLD TONE SCANNER

[75] Inventors: Herman Deutsch, Buffalo Grove, Ill.; William R. Smith, Morristown, N.J.; John P. Wittman, Raleigh, N.C.; David Yeh, Milpitas, Calif.

[73] Assignee: Tele/Resources, Inc., Ballston Lake, N.Y.

[21] Appl. No.: 888,875

[22] Filed: Mar. 22, 1978

[51] Int. Cl.² .............................................. H04Q 3/24
[52] U.S. Cl. ................................................. 179/18 FG
[58] Field of Search ................................. 179/18 FG

[56] References Cited
U.S. PATENT DOCUMENTS

| | | | |
|---|---|---|---|
| 3,551,603 | 12/1970 | Haugk | 179/18 FG |
| 3,723,661 | 3/1973 | Dellecker et al. | 179/18 FG |
| 3,936,611 | 2/1976 | Poole | 179/18 FG X |

*Primary Examiner*—William C. Cooper
*Attorney, Agent, or Firm*—Hopgood, Calimafde, Kalil, Blaustein & Lieberman

[57] ABSTRACT

The lines or stations of a multi-line office telephone system are sequentially examined to detect a hold tone signal of a specified frequency or frequencies on one or more of the lines. The lines are examined for increasingly longer time periods in accordance with the type of energy sensed at each line. If the line is not active or connected in a first brief period, the scanner then proceeds to examine the next line for a hold tone signal. If wide-band energy is not detected on the line in a second, longer period, the examination of the line is terminated and the scan process is continued to the next line. If wide-band energy above a threshold is detected on the line in a third, still longer period, the detected energy is further examined to determine whether this energy includes a valid hold tone signal. If a hold tone signal is detected on a line, the line is scanned again to detect the removal of the hold tone signal therefrom, whereupon a hold status is assigned to the line.

22 Claims, 5 Drawing Figures

HOLD TONE SCANNER

The present invention relates generally to telephone equipment, and more particularly to equipment for detecting a hold command on one line of a multi-line telephone switching system and thereupon assigning a hold status to that line.

One of the functions commonly performed in an office telephone system is the "hold" function, which allows the user of a telephone to place a call then in process on "hold," and then to accept or make another call without disconnecting the original, temporarily discontinued call. In order for the telephone system to perform a hold operation, the user must be able to communicate a hold instruction to the central or common control, or PBX, which, upon processing and recognizing this hold command, produces a dial tone on another line while maintaining the original call.

One known technique for providing a hold instruction to the control is for the user to press down briefly on the cradle button, which is recognized at the control as a hold instruction; the control then provides a dial tone on the user's line. The problem with this arrangement is that if the cradle button is operated for too long, the active call may become inadvertently disconnected. Moreover, the cradle button may be accidentally touched for a short time, which may result in an improper assignment of an undesired hold status to that line.

Another approach that has been used in office telephone systems is to provide each telephone in the system with a separate "hold" button, which when pressed by the user, generates a pulse signal having a characteristic parameter to the control, which thereupon initiates a hold function and assigns a dial tone to the line. In this system, a cradle button associated with special circuitry is activated to produce a second pulse signal to instruct the PBX to perform a disconnect operation. The PBX is provided with a line scanner which sequentially examines each line to see whether the line contains either a hold or disconnect pulse signal, and, upon the detection of the appropriate signal, assigns the appropriate hold or disconnect function to that line.

The major disadvantage of this arrangement is that it requires the provision of a special, nonstandard telephone instrument. The additional hold and disconnect buttons and associated circuitry result in an increase of the cost of each telephone and also requires a modification of the PBX, which is designed to operate with standard telephone instruments, to give it the capability of processing the additional hold and disconnect functions.

It is, therefore, an object of the invention to provide a system for providing a hold function in a multi-line or multi-station telephone system which employs an unmodified, standard telephone instrument.

It is a further object of the invention to provide a multi-line telephone system in which a hold command can be quickly and accurately detected in any one of the lines, and a hold status thereupon assigned to that line.

In accordance with the invention, one of the auxiliary buttons on the key pad of a conventional Touch-Tone telephone instrument, here the * or asterisk key, is designated as a hold command button. When operated, this button produces a characteristic two-frequency signal on the line or station of the instrument. To provide a separate tone detector for each line of a multi-line (typically 100–150 lines) telephone system would be prohibitively costly, whereas scanning each line for the time necessary to properly detect a narrow-band hold tone signal on one or more of these lines would require too much time — upwards of five seconds to allow each line in the system to be examined. Each of these approaches is, therefore, unacceptable for use in a typical commercial office telephone system.

The system of this invention overcomes these drawbacks by the use of a single tone filter by examining each of the plurality of lines for increasingly longer periods to determine the nature of the signal on the lines; that is, the dwell time on each line is determined by the energy or signal detected on the line. Thus, lines which are not connected or active are scanned for a very brief period, whereas lines on which a signal of some sort is present are examined for a second, longer period to determine the nature of the signal on the line. Lines on which either a hold tone or a speech signal are detected are examined for a still longer third scan period during which the presence of a hold command or hold tone signal can be positively verified. If the examination of a line in either the first or second periods indicates no activity on the line or the absence of wide-band energy on the line, the examination of the line is terminated and the scanner is switched to begin a similar examination of the next line on which the foregoing process is repeated.

Upon the detection of a hold tone signal on a line, a hold command signal is transmitted to the control. In addition, as in the embodiment of the invention herein described, the lines are subsequently sequentially again examined to detect the removal of the hold tone signal from a line on which a hold tone signal was previously detected. When the removal of the hold tone is detected, an additional signal is applied to the common control, which thereupon assigns a hold function to the line and provides a dial tone to that line.

Since a hold command will usually be present at one time on only one or two out of a total of the 100 to 150 lines, which make up a typical commercial or office multi-line telephone system, all of the lines in the system can be processed by the use of a single set of tone detectors within a brief time, typically a second or less. By extension, a relatively small number of detectors may serve larger telephone systems.

To the accomplishment of the above and to such further objects as may hereinafter appear, the present invention relates to a hole tone scanner and detector, substantially as defined in the appended claims, and as described in the following detailed specification as considered with the accompanying drawings in which:

Broadly described, the system of the invention operates in three different sequences of progressively longer dwell periods. In the first period, a line which is not connected or active is rejected, and the next line is examined. Any line on which wide-band energy is detected, which may be speech or a valid tone hold signal, is processed for a second, longer period. The line is then subjected for a third, still longer period to a narrow-band energy detect operation to determine whether the signal on the line contains the characteristic hold tone frequency or frequencies. If it does, a hold command is generated; if it does not, the sequence is repeated on the next line and continues until each line is thus examined, after which the scanning process is repeated.

The system of the invention is herein described with reference to a particular telephone system, and the following description of this system uses certain designations for signals and components for the purpose of describing the system and its manner of operation. It will, however, be appreciated that this description is not in any way limiting in nature.

The hold tone scanner of the present invention consists of a station audio scanner and an audio tone detector. The audio scanner causes the plurality of lines in the system to be scanned according to a predetermined sequence and for periods of increasing lengths determined by the activity and energy detected on each of the lines. The audio tone detector portion of the system detects the hold tone energy and voice-band energy, and produces the appropriate tone and energy detect signals for use by the logic circuits of the station audio scanner.

The tone signal that is generated by the user desiring to have a hold function assigned to his line is produced, in this system, by operating the * key on a conventional Touch-Tone pad, which produces a characteristic pair of tones on the user's line. It is the detection and subsequent release of this frequency pair on a line that is sensed to assign a hold function to that line.

Figure 1:
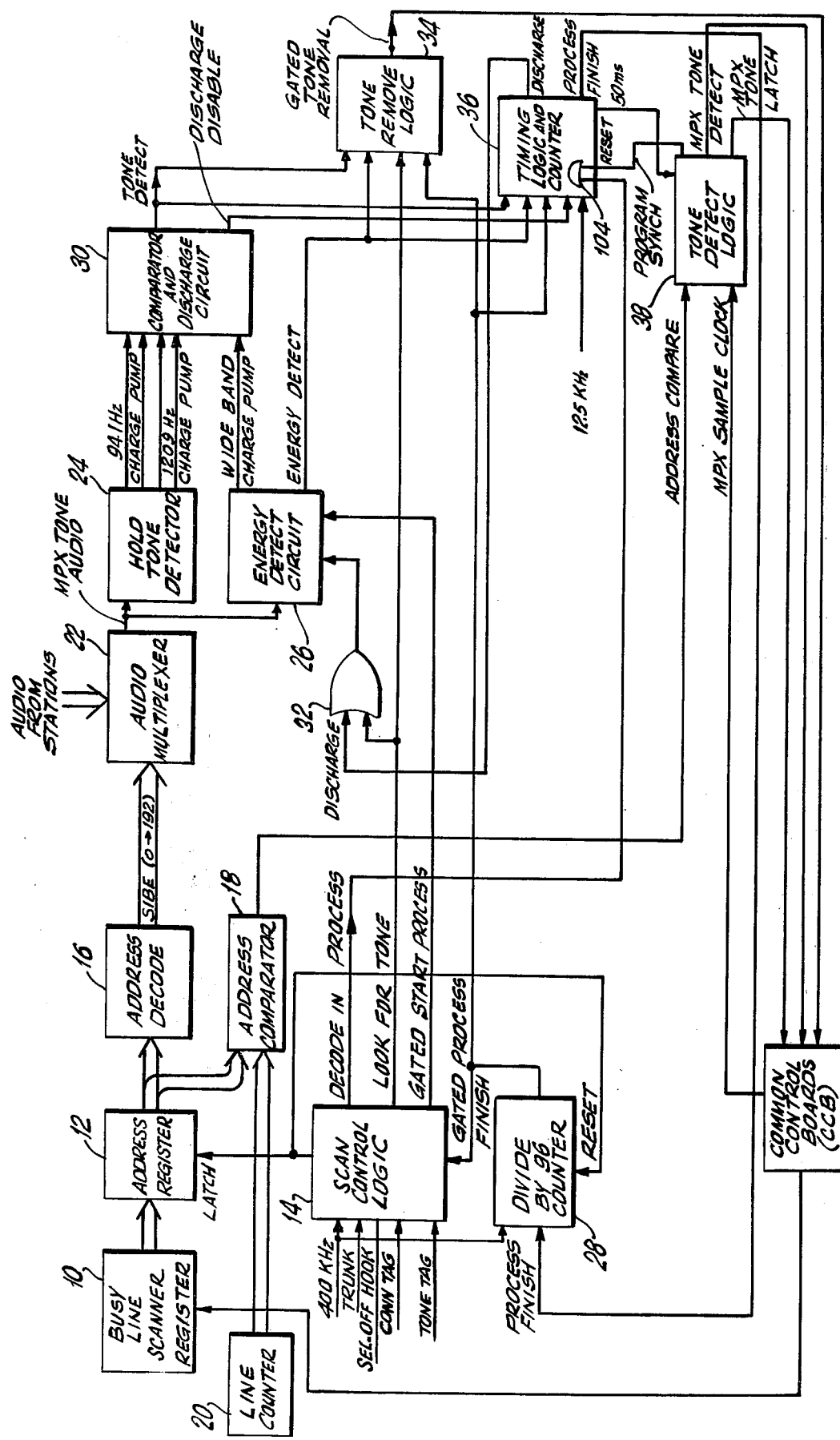
FIG. 1 is a schematic block diagram of a hold tone scanner according to an embodiment of the invention.

As illustrated in FIG. 1, the station audio scanner receives data from a shift register or scanner 10 which contains, in binary form, the address of every line in the system that is active, on hold, or in any way associated with a call. Each 240 μs., register 10 produces an 8-bit busy line select (BLS) signal, which is applied to an address latch 12 when the latter receives a latch signal from a scan control logic 14.

The eight line-address bits are applied to an address decoder 16 and to an address comparator 18, which also receives an eight-bit line control (LC) signal from a line counter 20 also part of the PBX common control. When the comparator 18 detects a correspondence between the line address of the shift register of the line being scanned and the line counter address signal, it produces the Compare Address (CMPR ADDR) signal.

The output of address decoder 16 produces individual select signals which are applied to the control inputs of an audio multiplexer 22. Multiplexer 22 also receives the audio signals from all of the stations in the system, and, under the control of the input signals from address decoder 16, selects the audio signal from the selected line and applies that signal as a Multiplex (MPX) Tone Audio signal to a hold tone detector circuit 24 and to an energy detect circuit 26, which are described in greater detail below.

The station audio scanner further includes a divide by 96 counter 28, which is connected to the scan control logic 14. Counter 28 is initialized each time the address register 12 is loaded and is advanced with the 400 kHz clock. This allows the addresses from the busy line scanner 10 to be scanned sequentially by the audio scanner since there are always 96 addresses that appear at a 400 kHz rate.

Before describing the remainder of the station audio scanner, description is made of the audio tone detector portion of the system which, as noted, detects the presence on a line of the hold (*) tone energy and voice-band energy.

The audio tone detector includes the hold tone pair detector 24 and the energy detect circuit 26, which as previously stated, receive the MPX Tone Audio signal from the audio multiplexer 22. As described in more detail below, the hold tone pair detector includes a pair of active narrow-band pass filters which are centered at the two characterizing frequencies of the hold tone signal, namely 941 HZ and 1209 HZ, the frequencies produced by operating the * button on the Touch-Tone instrument. Detector 24 further includes storage or charge pump circuits for each of the hold tone frequencies.

When detector 24 detects the hold tone frequency in the audio signal on the line being scanned, it produces 941 HZ and 1209 HZ charge pump signals, which are applied to the inputs of a comparator and discharge circuit 30. The comparator and discharge circuit 30 includes comparators which determine whether the audio signals applied to this circuit contain a valid tone pair, which is considered as a hold signal. As will be described in greater detail below, the comparators determine whether the relative and absolute values of the hold tone pairs are at predetermined levels, and whether the wide-band (voice) energy is at a sufficiently lower level than the hold tone pair signals.

The energy detect circuit 26 includes a voltage detector which produces, upon the sensing of wide-band energy in the audio signal, a wide-band charge pump signal, which is applied to comparators in circuit 30, and also produces an Energy Detect signal. Energy detect circuit 26 also receives the output of an OR gate 32, which, in turn, receives at its inputs, the Discharge signal and the Look for Tone signal, the latter being produced by the control decode circuit 14.

If the signal applied to the circuit 30 for the particular line or station being scanned contains hold tone energy, the circuit 30 will produce a Tone Detect signal. In addition, when sufficient tone (narrow-band) or voice (wide-band) energy is present in the station being scanned, additional comparators in circuit 30 produce a Discharge Disable signal. The Tone Detect signal from comparator and discharge circuit 30 and the Energy Detect signal from energy detect circuit 26 are applied to a tone remove logic circuit 34, which further receives the Look for Tone signal from the control decode circuit 14.

The Tone Detect and Energy Detect signals are also applied to the inputs of a timing logic and counter circuit 36, which also receives the Discharge Disable signal from the comparator and discharge circuit 30 and the Gated Process Finish signal from the divide-by-96 counter 28. The timing logic and counter circuit 36 also receives a series of 12.5 kHz signals from a clock source (not shown), the Decision in Process signal from control decode 14, and the Program Synch signal from a tone detect logic circuit 38.

The tone detect logic circuit 38 receives the Address Compare signal from the address comparator 18 and an MPX Sample Clock signal from one of the system common control boards (CCB) 40. Tone detect logic circuit 38, upon the detection of a hold tone signal on the station being examined, produces an MPX Tone Detect signal and an MPX Tone Latch signal, both of which are applied to the CCB 40, which upon the presence of these signals assigns a hold command to the station.

Before describing the circuits shown in block form in FIG. 1 in greater detail, the hold tone scanner flow process is now described with reference to the system flow chart in FIG. 5. The system essentially performs two distinct functions before a hold status is assigned to a station. First, the station is scanned to detect the presence of a hold tone signal; second, the removal of the hold tone signal is detected from the station. The flow chart of FIG. 5 contains two loops respectively corresponding to these operations.

The first loop is entered after it has been determined, as shown at 42, that the address being scanned is not a null address; that is, the all-zero address, which will appear wherever a system connection position is neither unoccupied nor a trunk. If the address is a null address, the process is consecutively repeated until a station address is scanned. The scanner also cannot be in a Decision in Process State; that is, the scanner must complete scanning one station before it begins to look at or scan another line. The station scanned must also not be on a trunk line and the timing must be in phase with the 400 kHz system clock. These states are monitored in the scan control logic 14, as described in more detail below. The decision is then made at 44 whether or not the station is in the connected state by detecting the presence of the "Conn" Tag on the station. The satisfaction of these conditions indicates that the station being scanned is in the connected state and that a hold tone signal may be present on that station.

If the "Conn" Tag is present on the station, the presence or absence of the hold tone signal on the station is detected as indicated at 46. If no energy is detected within a 2.5ms. period, or if no hold tone is detected within a 15.3 ms. period, a Process Finish signal is produced which initiates a process finish procedure and the scanning of the next address.

If a hold tone signal is present on the station for 50 ms., a valid hold signal is assumed to be decoded, and the MPX Hold Detect and MPX Latch signals are produced by the tone detect logic circuit 38. These signals are applied to the common control, which then changes the station's tag from Conn Tag to Hold Tone Tag. The Process finish signal is also at this time unconditionally produced to commence a scan on the next line.

The detection of a tone detect signal is synchronized with the system connection control scanner by means of a wait for comparator match circuit 48, which is included in tone detect logic circuit 38. Circuit 38 receives the Address Compare signal from the address comparator 18, as well as sample clock pulses.

In the event that the decision made at 44 is that no Conn Tag is on the station, and the decision made at 50 is that no Hold Tone Tag has been assigned to the station, that is, no hold tone was previously detected at that station, the scanning of the station is terminated and scanning is initiated for the next station.

Figure 5:
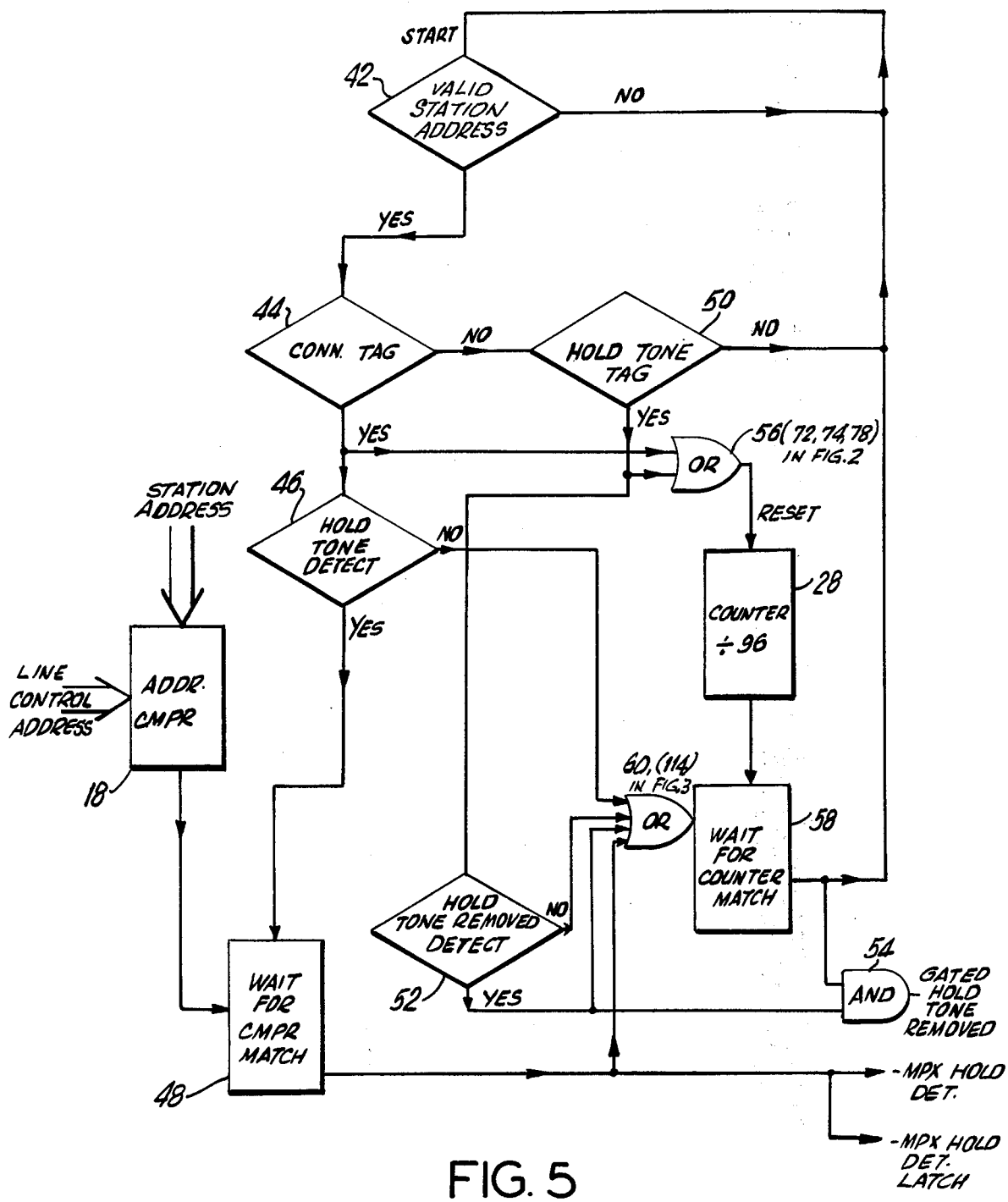
FIG. 5 is a flow chart illustrating the logic operations performed by the hold tone scanner of the invention.

The second loop of the flow diagram of FIG. 5 is entered when the previous scan of the station under consideration indicated the presence of a hold tone signal. However, before the station, which had previously been identified as having a hold signal, is given hold status by the CCB, the removal of the hold signal from that station must first be detected.

To this end, the station, which was placed in the Hold Tone Tag condition during a previous scan, is again investigated to detect the removal of the hold signal. If a hold tone tag has been assigned to the line as determined at 50, the subsequent removal of the hold tone is detected at 52 by sensing the absence of wide-band energy on the line during the second scan within a period of 2.5msec. $< t = 15.3$ msec., or by the absence of a valid hold tone signal at $t = 15.3$ ms.

The detection of the removal of the hold signal from a line on which such a signal was previously detected in a process described in the first loop produces a Gated Hold Tone Remove signal at the output of the AND gate 54, which is contained in the tone remove logic circuit 34. This signal, as shown in FIG. 1, is applied to the CCB, which, in response to this signal, modifies the tag code on the station from a Hold Tone Tag to Hold Tag, whereby the call on the station is placed on hold and the user hears a dial tone on his line, as is desired.

When the decision at 52 is that the hold signal has not been removed from the station on which a hold signal was previously detected, a Process Finish signal is produced and the scanner continues to scan other stations. Each station on which a hold tone signal was detected, that is, each line on which a Hold Tone Tag is present, will be processed through this second loop in each scan cycle until the removal of the hold signal from the station is detected.

The process finish procedure for each station is synchronized by means of synchronizing signals produced by the counter 28, which receives a reset signal from the OR gate 56. The gate 56 produces a reset signal when it receives an input signal indicating the detection of either a Conn Tag at 44 or a Hold Tone Tag at 50. The counter synchronizing signals are applied to wait for counter logic circuit 58, which also receives an input from an OR gate 60. The latter receives a signal to initiate a process finish procedure upon the failure to detect a hold tone signal at 46, the presence or absence of the hold tone removal at 52, or the receipt of an output from the wait for comparator match circuit 48.

The process finish procedure, which as noted, initiates a scanning of the next station, is thus itself initiated when the scanner has reached a decision on the station being scanned with respect to the presence or absence of the hold tone signal on the station and/or the removal of the hold tone signal from the station. As a result of the synchronization provided, the scanner is not permitted to latch onto the next station until the divide by 96 counter 28 returns to the zero state. This insures consecutive scanning.

Figure 2:
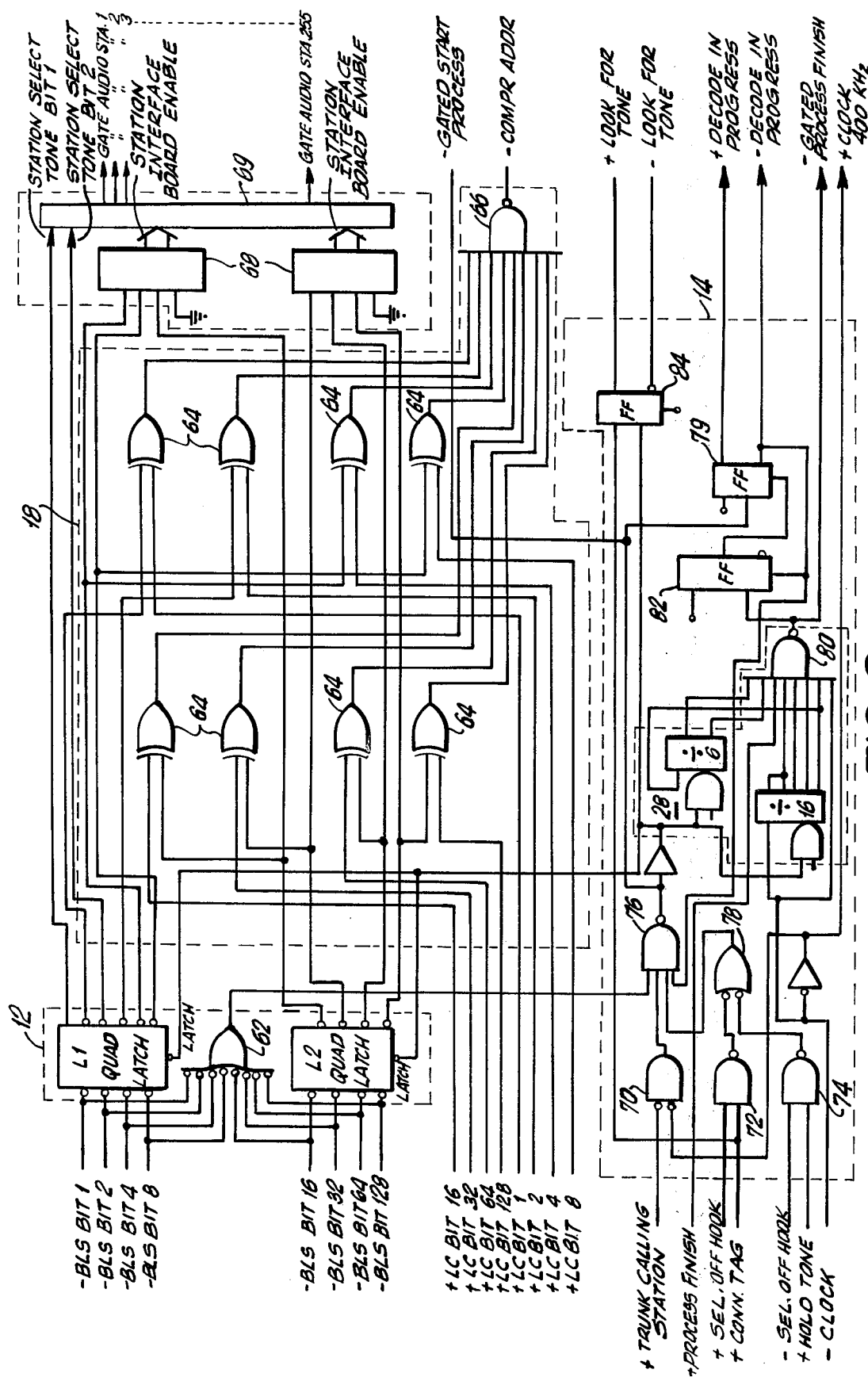
FIG. 2 is a more detailed schematic diagram of the address decode and control decode portions of the hold tone scanner of FIG. 1.
Figure 3:
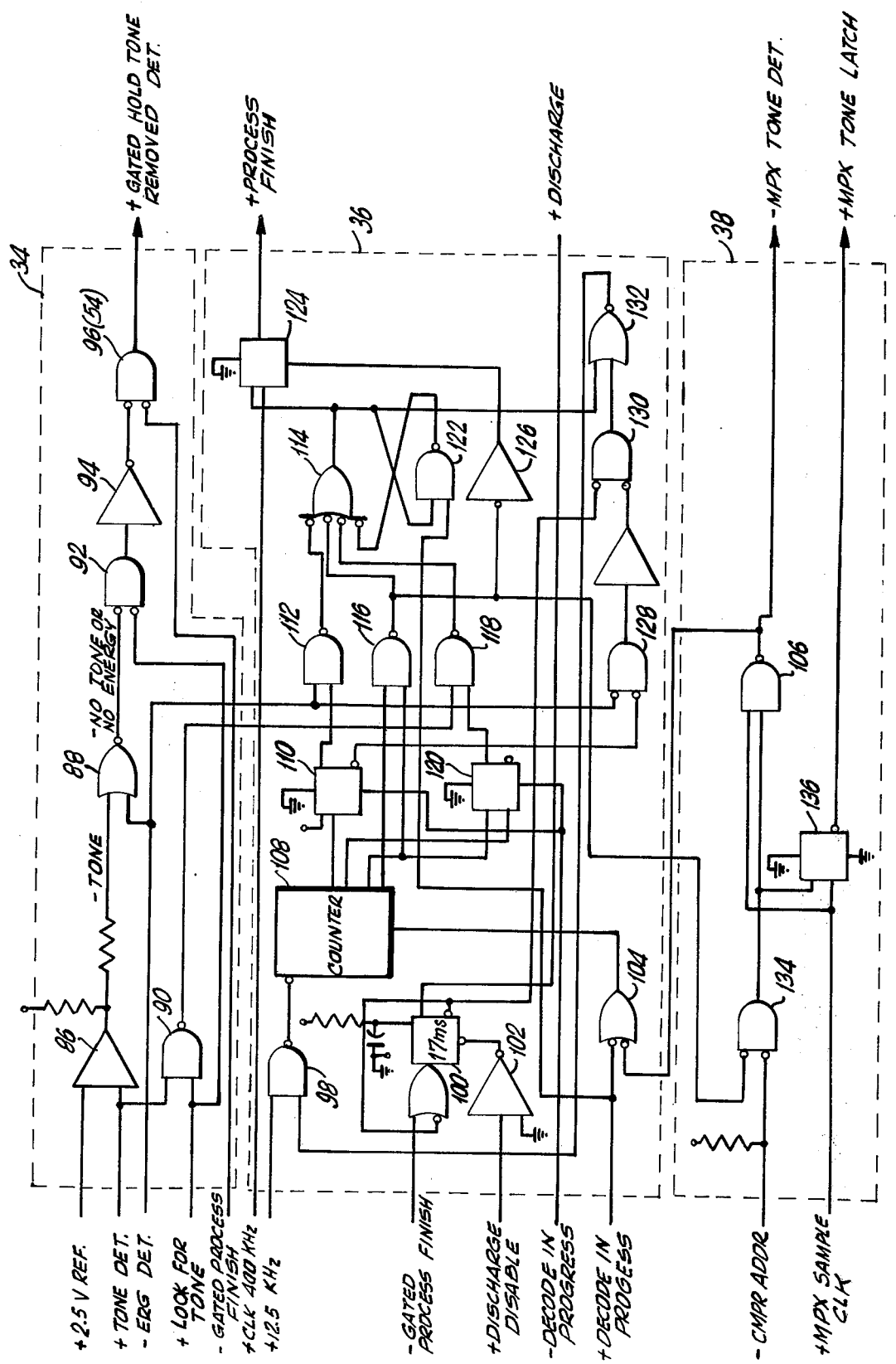
FIG. 3 is a more detailed schematic diagram of the tone remove logic, timing logic, and tone detect logic portions of the hold tone scanner of FIG. 1.
Figure 4:
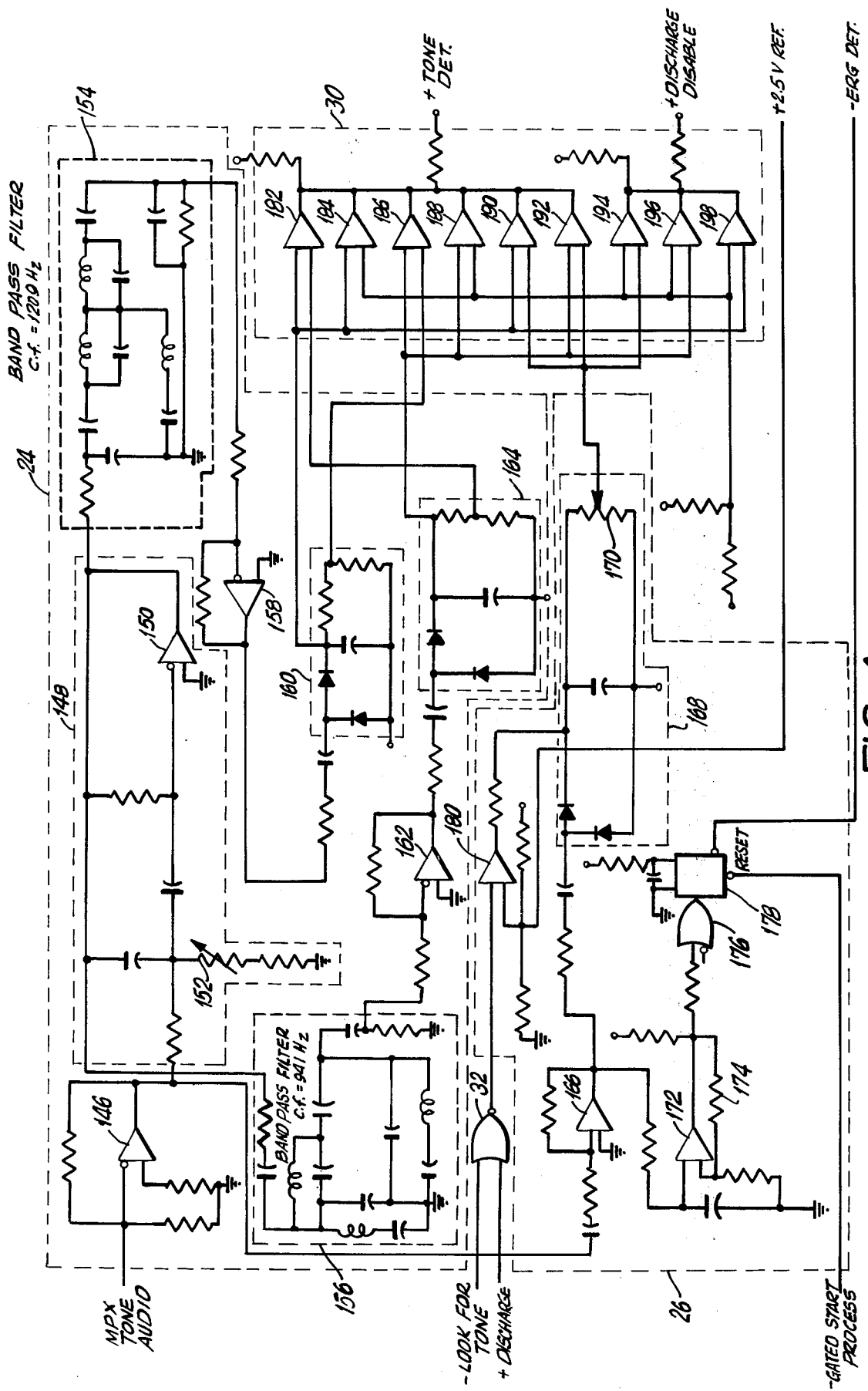
FIG. 4 is a more detailed schematic diagram of the tone pair detector, energy detect circuit, and comparator and discharge circuit of the hold tone scanner of FIG. 1.

Having described broadly the system of the invention and the manner in which it operates, a more detailed description is now provided of the system with reference to FIGS. 2, 3 and 4.

Referring to FIG. 2, there is shown a pair of 4-bit (quad) bistable latches L1 and L2, each of which receives four bits of the eight-bit signals from the Busy Line Select scanner 10. Latches L1 and L2 constitute the address register of FIG. 1. The eight bits from the Busy Line scanner are also applied to a NAND gate 62.

The outputs of the latches are applied along with the Line Control signals to the appropriate inputs of eight Exclusive-OR gates 64, which, together with NAND gate 66, which receives inputs from the outputs of each of gates 64, constitute the address comparator 18 of FIG. 1. The outputs of the latches are also applied to BCD-to-decimal decoders 68, whose outputs are in turn applied to decoder 69 which is distributed among the station interface boards and produces the signal applied to the audio multiplexer to select that station's audio. Decoders 68 and 69 form address decoder 16. In operation, the eight-bit address scanned by the Busy Line scanner is latched into the quad latches when the conditions in scan control logic 14 as described below are met. The signals are, in turn, decoded by decoders 68 to form 18 control signals, which are applied to the distributed station decoder 69 which are in turn applied, as shown in FIG. 1, to the audio multiplexer 22. These signals determine the station to be scanned and gate that station's audio signal onto the scanner board, which contains the scanner and logic circuits of the system.

The eight bits of the line counter signal are compared by the Exclusive-OR gates 64 with the address of the stations being scanned to form the Compare Address signal, which is necessary to synchronize the scanner to the system line counter so that the Tag Code of the station being scanned can be modified.

The control decode circuit 14 comprises a NOR gate 70, which receives the Trunk Calling Station signals and the clock signals; and a NAND gate 72, which receives the Select Off Hook and Conn Tag signals; and a NAND gate 74, which receives the inverse of the Select Off Hook signal and the Hold Tone Tag signal. The output of gate 70 is applied to a NAND gate 76, which also receives the output signal of gate 62. The outputs of gates 72 and 74 are applied to a NAND gate 78, whose output is applied as an additional input of gate 76.

The inverted output of gate 76 is coupled to the latches L1 and L2 to latch the station addressed into these latches as described, thereby causing the scanner to stop at the station for further investigation to determine the presence of a hold signal at the station. That same signal is the Gated Start Process signal, which is applied to the energy detect circuit 26. The output of gate 76 is also applied to trigger a flip-flop 79, which produces the true and inverse of the Decode In Process signal.

The output of gate 76 is also applied as a reset signal to the divide-by-96 counter 28, which also receives clock pulses. Counter 28 counts down the pulses and applies them to the inputs of a NAND gate 80, which also receives the clock pulses and the Process Finish signal from the timing logic and counter circuit 36. The output of gate 80 is applied to a flip-flop 82 of which the true output is connected to the reset or clear terminal of flip-flop 79. The reset terminal of flip-flop 82 is coupled to the inverse terminal of flip-flop 79 as well as to one input of gate 76. The output of gate 80 also constitutes the inverse Gated Process Finish signal that is applied to the tone remove logic circuit 34. The Conn Tag signal is also applied to one input of a flip-flop 84, which receives another input from the output of gate 76. The outputs of flip-flop 84 are the true and inverse of the Look for Tone signal that is applied to the energy detect circuit 26 and the tone remove logic circuit 34.

In order for the control decode circuit 14 to cause the scanner to stop at a station by producing a latch signal, the following must all be true, corresponding to the true or positive inputs to gate 76, derived from gates 70, 72, 74 and 78.

1. The scanned address cannot be a null address.
2. The scanner is not in a Decision in Process state for another station.
3. The scanned address is not a trunk line and the timing is in phase with the system clock.
4. The station is in either off hook in a scanned connection that has a Conn Tag or is not off hook in a scanned connection that has a Hold Tone Tag.

The fact that the scanner stopped at a specified station as a result of the existence of either of conditions 4 is registered as the true output of flip-flop 84. In the first of conditions 4, that the station connection has a Conn Tag, the scanner is searching for the presence of a valid hold tone. In the latter condition, that the station connection has a Hold Tone Tag, the presence of the hold tone has already previously been detected and the scanner is now searching for the absence (or removal) of the hold tone signal.

Since 96 addresses will be presented by the Busy Line scanner, the divide-by-96 counter 28, as noted, is implemented so that the scanner will scan sequentially to the address of the next station after stopping at one specific station. The scanner is stepped to the next station to examine its hold status when the true output of flip-flop 79 is false, indicating the absence of a Decision in Process signal.

FIG. 3 illustrates the tone remove logic circuit 34, the timing logic and counter circuit 36, and the tone detect logic circuit 38.

The tone remove logic circuit 34 comprises a voltage comparator circuit 86 which receives a 2.5 volt reference and the Tone Detect signal from the comparator and discharge circuit 30. The output of comparator 86 is a Tone signal, which is applied as one input of a NOR gate 88. The other input of gate 88 is the inverse of the Energy Detect signal received from energy detect circuit 26. A NAND gate 90 also receives the Tone Detect signal as well as the Look for Tone signal from the scan control logic 14. The output of gate 90 is applied to the timing logic circuit 36 for the purposes described below.

The output of gate 88 is applied to one input of a NOR gate 92, the other input of which is the Look for Tone signal. The output of gate 92 is inverted in an inverter 94 and is applied to one input of a NOR gate 96. The other input to gate 96 is the inverse of the Gated Process Finish signal received from counter 28.

Thus, if the scanner is looking for the removal of the hold tone from the station following the previous detection of a hold tone on that station, and if no energy or tone is detected, the output of gate 96 will be true. This output is the Gated Hold Tone Removed Detect signal, which, as noted, is applied to the CCB 40, which, upon the receipt of this signal, changes the Hold Tone Tag of the station to that of Hold Tag, whereupon a hold status is assigned to the station.

The several scanning periods in which the presence of wide-band and hold tone energy in the station audio is detected are controlled by the timing logic circuit which, as shown in FIG. 3, includes a NAND gate 98, which receives 12.5 kHz timing pulses at one input and the inverse of a Stop Counter signal that is produced in a manner to be described. The inverse of the Gated Process Finish signal from counter 28 is applied through an OR gate to a one-shot 100, which when it receives an input, produces a 17 ms. pulse, which is the Discharge signal provided to the energy detect circuit 26. The reset terminal of flip-flop 100 is derived from the output of an inverter 102, which receives the Discharge Disable signal from the comparator and discharge circuit 30.

The timing logic and counter circuit 36 also receives the true and inverse of the Decode in Progress signal from the control decode circuit 14. The true of this signal is applied to one input of a NAND gate 104, the other input of which is obtained from the output of a NAND gate 106. The output of gate 104 is applied to the reset terminal of a 12-stage ripple counter 108, which also receives the 12.5 kHz count signals from the output of gate 98.

The 2.5ms output of counter 108 is connected to an input of a flip-flop 110, which receives the inverse of the Decode in Progress signal at its reset terminal. The output of flip-flop 110 is applied to one input of a NAND gate 112, which receives the inverse of the Energy Detect signal from the energy detect circuit 26 at its other input.

The output of gate 112 is applied to one input of a NAND gate 114 which is the true side of a latch formed in conjunction with NAND gate 122. Two outputs of counter 108 are applied as the inputs of a NAND gate 116, which produces a 50ms. gate at its output. This 50ms. gate is applied to another input of gate 114, as well as to the input at tone detect logic circuit 38.

The output of gate 90 in tone remove logic circuit 34 is applied to one input of a NAND gate 118, which receives as its other input a gate after 15.3ms. produced by flip-flop 120. The latter is controlled by signals derived from the counter 108 and is reset by the inverse of the Decode in Progress signal. The output of gate 118 is applied as another input of gate 114.

The fourth input to gate 114 is obtained from the output of NAND gate 122 which is one of the latch back signals. Gate 122 receives at its inputs the true Decode in Process signal and the output of gate 114 the other latch back signal. The output of gate 114 (the inverse output) is also applied to the D input of flip flop 124, which also receives 400 kHz clock pulses at its clock output. The reset for flip-flop 124 is obtained from the output of an inverter 126, which receives the 50 msec. gate from the output of gate 116.

The inverse of the 2.5ms. flip-flop 110 is also applied to one input of a NOR gate 128, which receives the inverse of the Energy Detect signal at its other input. The output of gate 128 is inverted and applied to one input of a NOR gate 130. The other input to gate 130 is the inverse of the 17 msec. output of one-shot 100. The output of gate 130 is applied to an input of NOR gate 132, the other input of which receives the true output of latch 114/122. The output of gate 132 is the stop counter signal, which, as noted, is coupled back to one input of gate 98.

The timing logic and control circuit 36 operates to minimize the time the scanner stops on one specific station in accordance with whether wide-band energy or tone energy is present at the station during one of these scanning or dwell periods, and causes the scanner to sequence to the next station upon the occurrence of any one of the specified conditions. This circuit makes use of a 12.5 kHz clock to drive the counter 108, the output of which allows the circuit to realize the lapse of time. The counter 108 is reset at all times when the scanner is in the idle state (not in the Decode in Process state). When a station address enters the scanner, as described in the previous description of the scan control logic 14, this starts the time reference at $t = 0$, and the counter 108 then starts to run.

The latch 114/122 is used to indicate that the decode process has come to an end. The output of the latch at gate 114 is then clocked to the flip-flop 124 for synchronization purposes. The output of flip-flop 124, which is the Process Finish signal, is true if either of the following conditions exist:

(1) When $t \geq 2.5$ msec., the energy detect circuit 26 shows no energy present in the audio channel being scanned as determined by the absence at the input at gate 112 of an inverse Energy Detect signal, such that when the 2.5ms. gate produced by flip-flop 110 is applied to gate 112 this gate is conditioned and set latch 114/112 whose true output is applied to flip-flop 124, which thereupon generates the Process Finish signal.

(2) When $t \geq 15.3$ msec., (a) For an active connection state, as indicated by a detected Conn Tag, no valid hold tone is present in the audio channel being scanned as indicated by the presence of a Look for Tone signal at the input of gate 90 but the absence of the tone detect signal at the other input of gate 90 will prevent gate 90 from becoming inverse and deconditioning the input of gate 118, such that the 15.3 msec. gate from flip-flop 120 will be applied to gate 114 to cause flip-flop 124 to become true and thereby generate the Process Finish signal.

(b) For a condition in which a tone has previously been detected on the line but has not yet been removed, the Look for Tone Signal is absent and the output of flip-flop 124 will unconditionally become true after the 2.5ms gate from flip-flop 110 becomes true.

(3) The presence of a hold tone is indicated if the counter reaches $t = 50$ msec. at the output of gate 116, which decodes the 50ms. gate from counter 108 and sets latch 114/122. This decode holds flip-flop 124 reset through inverter 126 thus delaying the process finish signal until the tag codes are appropriately changed as indicated by the compare address signal from address comparator 18 becoming true.

When latch 114/122 is set by one of the three conditions above, gate 132 becomes inverse stopping counter 108 by inhibiting the 12.5kHz clock pulses. The counter 108 remains in that state until it is reset by the Decode in Progress becoming inverse at gate 104 or by gate 104 becoming inverse. The Process Finished signal, indicated by the output of flip-flop 124 being true, is sent to the divide-by-96 counter 28, which will allow the scan to continue as described previously.

One-shot 100 is fired when the scanner is ready to release the address in process as indicated by the Gated Process Finish signal from the divide-by-96 counter 28 becoming true. The 17ms. gate produced by one-shot 100 is applied as a Discharge signal to the energy detect circuit 26 and allows a definite time period for the energy in the detect circuits to decay so that overspill of energy to the next station scanned does not occur, as will be described in the following discussion of those circuits.

The tone detect logic circuit 38 includes, as is shown in FIG. 3, a NOR gate 134, which receives the inverse of the Comparator Address signal at one input and the 50ms. gate output of gate 118 at its other input. The output of gate 134 is applied to one input of a flip-flop 136, as well as to one input of gate 106. The MPX Sample Clock signal received from the system comparing controls is applied to the other inputs of gate 106 and flip-flop 136.

The output of gate 106 is the inverse of the MPX Tone Detect signal. The true output of flip-flop 136 is the MPX Tone Latch signal. Both of these signals are applied to the CCB 40 to indicate the detection of a hold tone signal.

In the operation of the tone detect logic circuit 38, the Comparator Address and MPX Sample Clock signals are used for program synchronization. The output MPX Tone Detect and MPX Tone Latch signals are true only when the process comes to an end as a result of the detection of a hold tone signal as indicated by the 50 msec. decode becoming true. These signals, as noted previously, are used by the PCB and CCB to change the station (or time slot) concerned from Conn Tag to Hold Tone Tag. When the 50ms. decode becomes true, its inverse is applied to gate 134. When the compare address becomes inverse, the output of gate 134 becomes true resulting in flip-flop 135 becoming true when program synchronization is achieved as indicated by the MPX sample clock becoming true. MPX sample CLK being true also leaves gate 106 to be inverse resulting in the reset of counter 108 via gate 104. This removes the 50ms. diode at gate 116 and allows flip-flop 124 to become true and create the Process Finish signal. This will, in turn, allow the current station to be released from the scanner as described previously.

The audio tone detector portion of the scanner detects the presence or absence or wide-band (voice) or hold tone energy being scanned and produces, when appropriate, the Tone Detect and Energy Detect signals. The audio tone detector includes the hold pair detector 24, the energy detect circuit 26, and the comparator and discharge circuit 30, which are now described with reference to FIG. 4.

The hold tone detector 24 receives the audio signals from the individual station being scanned as decoded in multiplexer 22 from the output of a buffer amplifier 146 having a gain of −1. The hold tone detector, in the embodiment of the invention herein described, detects the tone pair at frequencies of 1209 Hz and 941 Hz produced by the activation of the * button on a conventional Touch-Tone telephone instrument.

The detector 24 includes an active band-pass filter 148 having a band pass of 318 Hz and nominally centered at 1066 Hz. Filter 148 includes an amplifier 150 having a nominal gain of 10, and a variable resistor 152. The variation of resistor 152 adjusts the center frequency of filter 148.

The output of band-pass filter 148 is applied to the input of a first passive narrow-band filter 154 having a center frequency of 1029 Hz, one of the hold tone frequencies, and is also applied to the input of a second passive narrow-band filter 156 having a center frequency of 941 Hz, the other hold tone frequency.

The output of filter 154 is applied to an amplifier 158, the output of which is applied to a 1209 Hz charge pump circuit 160, which integrates and stores the detected 1209 Hz signal. Similarly, the output of the filter 156 is applied to an amplifier 162, the output of which is applied to a 941 Hz charge pump circuit 164, which integrates and stores the detected 941 Hz hold tone signal. The resistance 152 is set to achieve nominally equal amplitudes of the two hold tone signals.

The output of amplifier 146 is also applied to the input of an amplifier 166 contained in energy detect circuit 26. The output of amplifier 166 is applied to wide-band energy charge pump 168, which includes a potentiometer 170. The output of amplifier 166 is also applied to one input of a comparator 172, which is configured with a hysteresis feedback resistor 174, which establishes a threshold value for the wide-band energy detect signal. When the amplified wide-band audio energy signal exceeds the threshold or reference signals to the comparator, the comparator produces a detect signal which is applied through a gate 176 to trigger a 2ms. one-shot 178. The output of one-shot 178, which receives the complement of the Gated Start Process signal from control decode circuit 14 at its reset terminal, is the Energy Detect signal that indicates the presence of wide-band energy on the line being scanned. This signal is applied to the tone remove logic circuit 34 and to the timing logic counter 36, as described previously.

As also noted above, the NOR gate 32 receives the inverse of the Look for Tone signal and the Discharge signal. The output of gate 32 is applied to one input of a comparator 180, which upon the receipt of a signal from gate 32, discharges the wide-band charge-pump 168. This occurs upon the presence of a discharge signal at the conclusion of a scan of a given line, and in the absence of a Look for Tone signal when the scanner is not locked onto a line and does not want to look at the audio energy.

The outputs of the tone and wide-band charge pumps 160, 164 and 168 are all applied to comparator and discharge circuit 30, which determines whether the audio signal at the station being scanned contains a valid tone signal which is considered to be a hold signal. The scanner, according to the embodiment of the invention herein described, decodes an audio tone as a valid hold tone and produces a Tone Detect signal, only if all of the following conditions are true simultaneously.

(1) The amplitudes of the hold tone pairs are within 6dB of each other.

(2) The amplitudes of each of the hold tone pairs are greater than −20dBm.

(3) The wide-band (voice) energy cannot be greater than the energy of either of the hold tone pair.

To perform these operations, the comparator and discharge circuit 30 includes a plurality of comparators 182–192. Comparators 182 and 186 each compare the appropriate outputs of the 1209 Hz charge pump circuit 160 and the 941 Hz charge pump circuit 164, to determine whether condition (1) is satisfied. The achieving of condition (2) is determined by comparators 184 and 188 which respectively compare the outputs of the 1209 Hz and 941 Hz charge pumps against a threshold reference applied to the other inputs of these comparators. The satisfaction of condition (3) is determined by comparators 190 and 192, which respectively compare the outputs of the tone pair charge pumps 160 and 164 against the output of the wide band charge pump 168, the relative output of which is present by the resistance 170. The outputs of comparators 182–192 are tied together to effect an AND function so that when all of the comparisons are made to indicate the satisfaction of the three cited valid tone detect conditions, the Tone Detect signal will become true indicating the detection of a valid hold tone signal on the line being scanned.

Circuit 30 also includes additional comparators 194, 196, and 198 which separately and respectively compare the outputs of charge pumps 168, 164 and 160 against a reference signal. These are also tied together to effect an AND function. When levels from each of the tone and wide-band charge pumps fall below the reference level, discharge of these circuits is indicated and the Discharge Disable signal becomes true and is applied to the reset of one-shot 100. The scanner is then released as described previously and is cleared to receive and process audio signals obtained from the next station.

It will thus be appreciated that the hold tone scanner of the invention effectively, reliably, and quickly detects the presence of a hold command on one or more lines of a multi-line telephone system, and also, upon the detection of the subsequent removal of the hold tone signal from that line assigns a hold status to the line. It will also be appreciated that modifications may be made in the embodiment that is specifically described hereinabove without necessarily departing from the spirit and scope of the invention.

What is claimed:

1. In a multi-line telephone system, a hold scanner for detecting the presence of a hold command made by the user on one of the lines, a hold command being initiated by producing a hold signal of a characteristic parameter on the line, said hold scanner comprising means for sequentially examining each of the lines for a first period, means for terminating the examination of the line if it is determined that the line is not an active one, means for examining a line which is active for a second period longer than said first period to determine whether the line contains wide-band energy in said second period, means for terminating the examination of the line after the second period if wide-band energy is not present on the line during said second period, and means for examining a line on which wide-band energy is detected for a third period longer than said second period to determine whether the characteristic parameter of a hold signal is present on the line.

2. The hold scanner of claim 1, in which said hold signal includes a signal having at least one characteristic frequency.

3. The hold scanner of claim 2, in which said examining means includes wide-band energy detecting means and means coupled to said wide-band energy detecting means for producing a wide-band energy detect signal upon the detection of wide-band energy on a line.

4. The hold scanner of claim 3, further comprising second means for detecting said hold signal when the latter is present on the line being examined, and means connected to said detecting means for producing a tone detect signal upon the detection of said hold signal.

5. The hold scanner of claim 4, further comprising first and second means for respectively storing the detected wide-band and hold signals during an examination of a line, and means for discharging said first and second storing means a predetermined time after the completion of an examination of the line.

6. The hold scanner of claim 4, in which said second detecting means includes at least one narrow-band filter centered at said at least one characteristic frequency, and said signal producing means including means connected to said narrow-band filter for storing said detected narrow-band signal.

7. The hold scanner of claim 6, in which said tone detect signal producing means comprises means for comparing the relative levels of the detected wide-band and narrow-band signals and for producing said tone detect signal when said wide-band and narrow-band signals bear a predetermined relation to one another.

8. The hold scanner of claim 2, in which said hold signal includes first and second frequencies produced by the operation of the * button on a Touch-Tone pad of a telephone instrument.

9. The hold scanner of claim 8, further comprising additional means for examining the lines after the previous detection of a hold signal on one of said lines and for detecting the removal of said previously detected hold signal on said one of said lines.

10. The hold scanner of claim 8, in which said examining means includes wide-band energy detecting means and means coupled to said wide-band energy detecting means for producing a wide-band energy detect signal upon the detection of wide-band energy.

11. The hold scanner of claim 10, further comprising first and second means for detecting said first and second frequencies respectively, and first and second storing means operatively respectively connected to said first and second detecting means for storing the detected signals at said first and second frequencies.

12. The hold scanner of claim 11, further comprising third means for storing said detected wide-band energy signal, and means for discharging said first, second, and third storing means at a predetermined time following the termination of the examination of a line.

13. The hold scanner of claim 11, in which said first and second detecting means comprises first and second narrow-band filters centered at said first and second frequencies, respectively.

14. The hold scanner of claim 13, further comprising means operatively connected to said first and second detecting means for producing a hold tone detect signal upon the detection of said first and second hold tone frequencies.

15. The hold scanner of claim 14, in which said tone detect signal producing means comprises means for comparing the levels of said wide-band signal and each of said first and second narrow-band signals.

16. The hold scanner of claim 15, in which said tone detect signal producing means further comprises means for respectively comparing said first and second narrow-band signals against a preset reference signal.

17. The hold scanner of claim 15, in which said tone detect signal producing means further comprises means for comparing the amplitudes of said first and second narrow-band signals against one another.

18. The hold scanner of claim 17, in which said tone detect signal producing means further comprises means for respectively comparing said first and second narrow-band signals against a preset reference signal.

19. The hold scanner of claim 15, in which said tone detect signal producing means further comprises means for comparing the amplitudes of said first and narrow-band signals against one another.

20. The hold scanner of claim 19, in which said tone detect signal producing means further comprises means for comparing the amplitudes of said first and second narrow-band signals against one another.

21. The hold scanner of claim 19, in which said tone detect signal producing means further comprises means for respectively comparing said first and second narrow-band signals against a preset reference signal.

22. The hold scanner of claim 20, in which said tone detect signal producing means further comprises means for respectively comparing said first and second narrow-band signals against a preset reference signal.

* * * * *

UNITED STATES PATENT OFFICE
CERTIFICATE OF CORRECTION

Patent No. 4,140,880    Dated February 20, 1979

Inventor(s) Herman Deutsch et al

It is certified that error appears in the above-identified patent and that said Letters Patent are hereby corrected as shown below:

Claim 19, column 14, line 51, after "and"

insert -- second --.

Signed and Sealed this

Twenty-second Day of May 1979

[SEAL]

Attest:

RUTH C. MASON
Attesting Officer

DONALD W. BANNER
Commissioner of Patents and Trademarks